(12) United States Patent
Nakagawa

(10) Patent No.: US 7,626,720 B2
(45) Date of Patent: Dec. 1, 2009

(54) INFORMATION PROVISION APPARATUS, PRINT SYSTEM AND INFORMATION PROVISION PROGRAM STORAGE MEDIUM

(75) Inventor: Tomohiro Nakagawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 861 days.

(21) Appl. No.: 11/334,459

(22) Filed: Jan. 19, 2006

(65) Prior Publication Data
US 2006/0164686 A1    Jul. 27, 2006

(30) Foreign Application Priority Data
Jan. 21, 2005    (JP)    ............... 2005-014601

(51) Int. Cl.
G06F 15/00    (2006.01)
G06K 9/40    (2006.01)

(52) U.S. Cl. ..................... 358/1.18; 382/255

(58) Field of Classification Search ............... 358/1.15, 358/1.18, 1.9, 527, 3.26, 1.13; 382/167, 382/266, 255, 275, 263; 396/78, 106, 311, 396/315; 355/40, 41, 32, 77; 348/333.12, 348/E7.09, E5.069
See application file for complete search history.

(56) References Cited

U.S. PATENT DOCUMENTS 6,646,760 B1 *    11/2003    Hanihara    ................. 358/1.9

FOREIGN PATENT DOCUMENTS

JP    2002-238080 A    8/2002
JP    2003-337774 A    11/2003

* cited by examiner

Primary Examiner—Saeid Ebrahimi Dehkordy
(74) Attorney, Agent, or Firm—Birch, Stewart, Kolasch & Birch, LLP

(57) ABSTRACT

There are provided an information provision apparatus capable of identifying a particular place with a high accuracy and providing information about the place, a print system for printing the acquired information on recording paper and providing it, an information provision program for causing a computer to operate as the information provision apparatus, and an information provision program storage medium in which the information provision program is stored. There are provided an area determination section which determines a particular search area including an image taking position indicated by position information, and a shop determination section which determines one shop from among one or more shops within the search area which are included in multiple shops, each of the multiple shops being associated with one or more reference images and one or more pieces of shop-related information, based on the degree of similarity between the reference image associated with the each of multiple shops and the taken image.

7 Claims, 16 Drawing Sheets

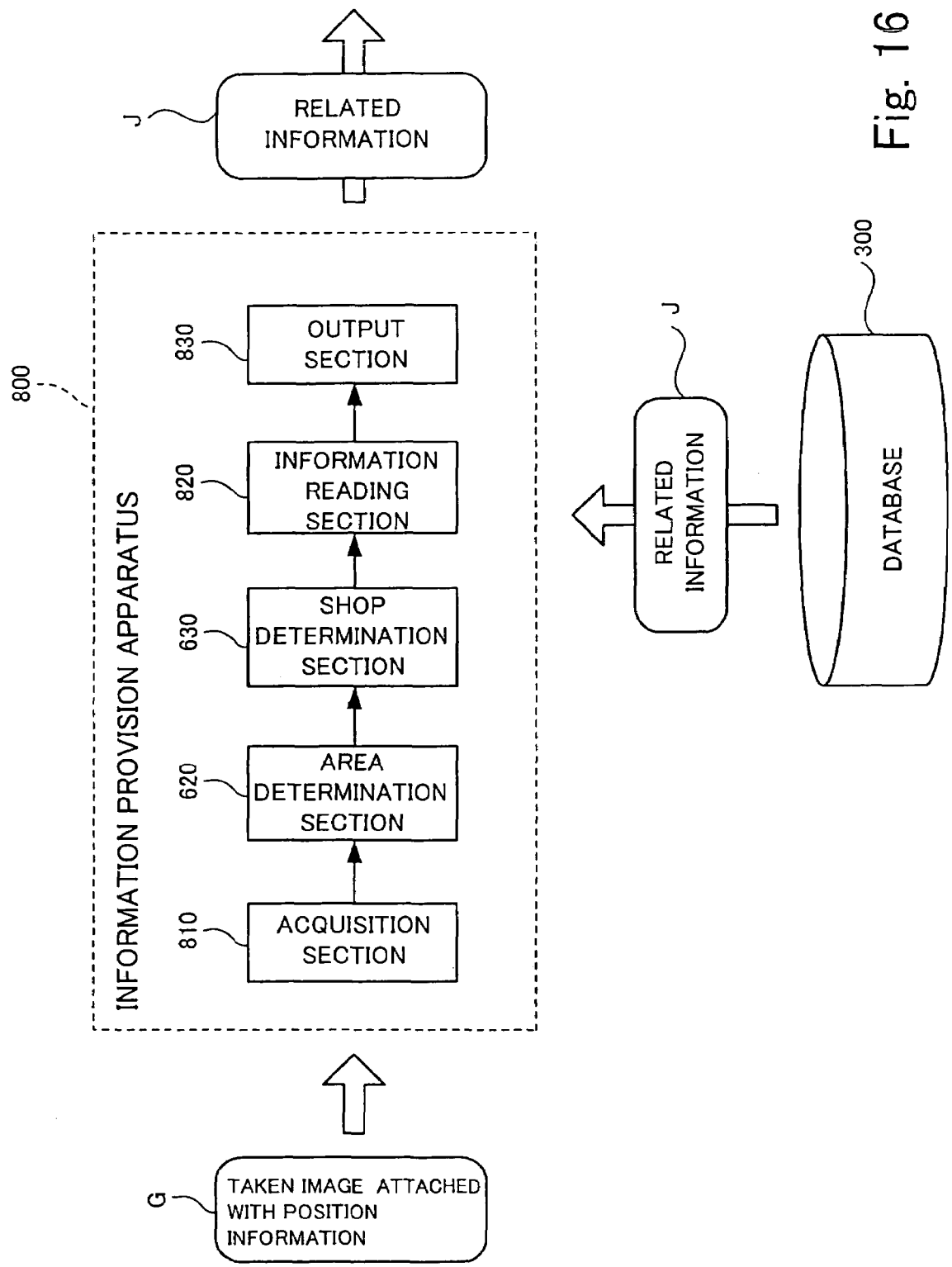

INFORMATION PROVISION APPARATUS, PRINT SYSTEM AND INFORMATION PROVISION PROGRAM STORAGE MEDIUM

BACKGROUND OF THE INVENTION

1. Field of the Invention

The present invention relates to an information provision apparatus for providing information related to a taken image, a print system for printing the related information on recording paper, and an information provision program storage medium storing an information provision program for causing a computer to operate as the information provision apparatus.

2. Description of the Related Art

A so-called GPS (global positioning system) for measuring the position of a target object by means of a dedicated artificial satellite has been commonly used and mainly applied to car navigation. Recently, this GPS has been increasingly applied to techniques other than car navigation.

For example, there is proposed a technique in which a GPS apparatus for acquiring position information by means of a GPS is mounted on an image-taking apparatus, such as a digital camera and a camera-equipped mobile phone, so that the image-taking position may be acquired together with a taken image when the image is taken.

Furthermore, for example, there is also proposed a technique in which, when an image is taken by an image-taking apparatus mounted with a GPS apparatus, information related to the image-taking position, such as the place name and the location of the image-taking position, is acquired based on position information obtained by the GPS and provided for the photographer (see Japanese Patent Laid-Open No. 2003-337774 (pp. 4-10 and FIG. 1), for example).

Furthermore, for example, there-is also proposed a technique in which a mobile terminal mounted with the GPS apparatus and an attitude sensor for acquiring attitude information such as orientation and inclination are prepared; when the user points the mobile terminal toward a place such as a shop, the place is identified based on position information and the attitude information obtained by the mobile terminal; and information related to the identified place, such as a shop guide, is provided to the mobile terminal user (see Japanese Patent Laid-Open No. 2002-238080 (pp. 3-19 and FIG. 4) for example).

As shown in Japanese Patent Laid-Open No. 2003-337774 and Japanese Patent Laid-Open No. 2002-238080, in identifying the image taking position or the place toward which a mobile phone is pointed to provide information, the position information obtained by means of a GPS is an effective clue to identify such a position. However, the position information obtained by a commonly used GPS may include an error of as much as several meters especially in a building, and in this case, identification of a place based on position information including such an error may also be incorrect, and as a result, incorrect information may be possibly provided.

SUMMARY OF THE INVENTION

The present invention has been made in view of the above circumstances and provides an information provision apparatus capable of identifying a particular place with a high accuracy and providing information about the place, a print system for printing the information on recording paper and providing it, and an information provision program storage medium storing the information provision program which causes a computer to operate as the information provision apparatus.

An information provision apparatus of the present invention is provided with:

an acquisition section which acquires a taken image obtained by image taking and position information indicating the image taking position in the image taking;

an area determination section which determines a particular search area including the image taking position indicated by the position information;

a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and an output section which outputs information associated with the one place determined by the place determination section.

According to the information provision apparatus of the present invention, it is a search area including candidates for a place to be finally determined that is determined based on the position information. Therefore, even if an error is included in the position information, it is only the candidates for the place that are obtained based on the position information which includes the error, and, finally, one candidate is targeted based on a different clue, that is, similarity between an image associated with each candidate and a taken image. For example, by using an image showing an object which sufficiently characterizes a place and which is likely to be photographed by a photographer, such as an advertising display or the appearance of the shop, as an image to be compared with the taken image in such targeting, the accuracy of the targeting will be enhanced. According to the information provision apparatus of the present invention, such an image can be registered, so that highly accurate targeting among place candidates within the search area can be easily realized. That is, according to the information provision apparatus of the present invention, it is possible to identify a particular place with a high accuracy and provide information about the place.

Here, an embodiment of the information provision apparatus of the present invention may be possible in which "the output section outputs the information associated with the one place to a printer." Alternatively, an embodiment is also possible in which "the acquisition section acquires the taken image and the position information from a provision source via a communication network, and the output section outputs the information associated with the one place to the provision source via the communication network."

According to the information provision apparatus of the former embodiment, it is possible to perform a service of printing information about one identified place and providing it to a photographer. According to the information provision apparatus of the latter embodiment, it is possible to perform a service of providing the information to a photographer via the communication network.

An embodiment of the information provision apparatus of the present invention in which "the position information indicates the longitude, the latitude and the altitude of the image taking position; and the area determination section identifies a building located at a place indicated by the latitude and the longitude indicated by the position information, and furthermore determines one or more floors of the identified building corresponding to the altitudes indicated by the position information as the search area" is a preferred embodiment.

According to this information provision apparatus of the preferred embodiment, it is possible to determine the search area by efficiently utilizing three-dimensional position information obtained by a GPS, for example.

An embodiment of the information provision apparatus of the present invention in which "there is provided an overhead view creation section which creates an overhead view showing the one place determined by the place determination section; and the output section outputs the overhead view created by the overhead view creation section in addition to the information" is also a preferred embodiment.

According to the information provision apparatus of the preferred embodiment, the one place determined by the place determination section can be clearly shown and provided in a figure by the overhead view.

A print system of the present invention is provided with:
an information provision apparatus including:
an acquisition section which acquires a taken image obtained by image taking and position information indicating the image taking position in the image taking;
an area determination section which determines a particular search area including the image taking position indicated by the position information;
a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and
an output section which outputs information associated with the one place determined by the place determination section; and
a printer which prints the taken image acquired by the acquisition section on one surface of recording paper and prints the information outputted by the output section on the back side of the surface.

According to the print system of the present invention, it is possible to perform a service of printing information about one identified place related to an image taken by a photographer on the back side of a photograph with the taken image printed on the front side and provide it.

In an information program storage medium of the present invention, an information provision program is stored, the information provision program being incorporated in a computer and constructing on the computer:
an acquisition section which acquires a taken image obtained by image taking and position information indicating the image taking position in the image taking;
an area determination section which determines a particular search area including the image taking position indicated by the position information;
a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and
an output section which outputs information associated with the one place determined by the place determination section.

The storage medium of the present invention may be a hard disk, a memory chip or the like, in addition to a storage medium such as an FD (flexible disk), CD-R, CD-RW, MO and DVD.

As for the print system of the present invention and the information provision program storage medium of the present invention, only the basic embodiments thereof are shown herein. This is simply intended to avoid overlap, and the print system of the present invention and the information provision program storage medium of the present invention include various embodiments corresponding to the respective embodiments of the information provision apparatus described above.

As described above, according to the present invention, it is possible to provide an information provision apparatus capable of identifying a particular place with a high accuracy and providing information about the place, a print system for printing the acquired information on recording paper and providing it, and an information provision program storage medium in which an information provision program for causing a computer to operate as the information provision apparatus is stored.

BRIEF DESCRIPTION OF THE DRAWINGS

FIG. 16 is a functional block diagram showing functions to be performed when the information provision program storage medium shown in FIG. 15 is installed in the server shown in FIGS. 5 and 6 and the server is caused to operate as a second embodiment of the information provision apparatus of the present invention.

DETAILED DESCRIPTION OF THE INVENTION

Embodiments of the present invention will be described below with reference to drawings.

Figure 1:
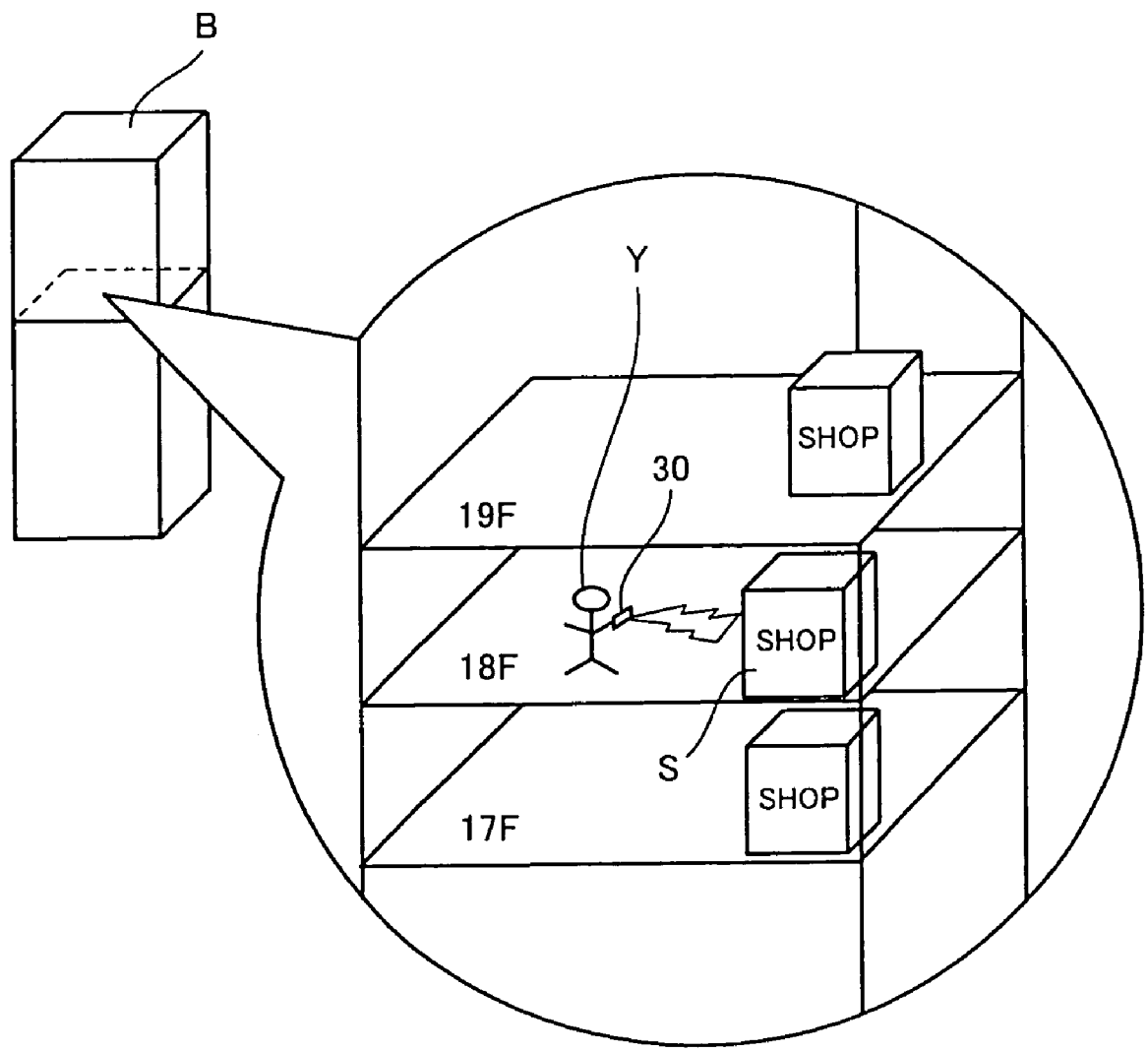
FIG. 1 is a schematic diagram showing that a photographer acquires a taken image and position information.

FIG. 1 is a schematic diagram showing that a photographer acquires a taken image and position information.

FIG. 1 shows that a photographer Y is taking a picture of an advertising display, the appearance or the like of one shop S located on the eighteenth floor of a building B, as an object showing the characteristics of the shop S, with the use of a camera-equipped mobile phone mounted with a GPS apparatus for acquiring position information by means of a GPS (hereinafter referred to simply as a camera-equipped mobile phone) 30. When the image taking is performed, the image taking position is acquired as three-dimensional position information indicated by the latitude, the longitude and the altitude and added to the taken image, in the camera-equipped mobile phone 30.

Description will be made below on an embodiment of a print system of the present invention for using the taken image attached with the position information to identify a shop characterized by the object shown in the taken image, and printing and providing information about the shop.

First, the print system of the present invention will be described.

Figure 2:
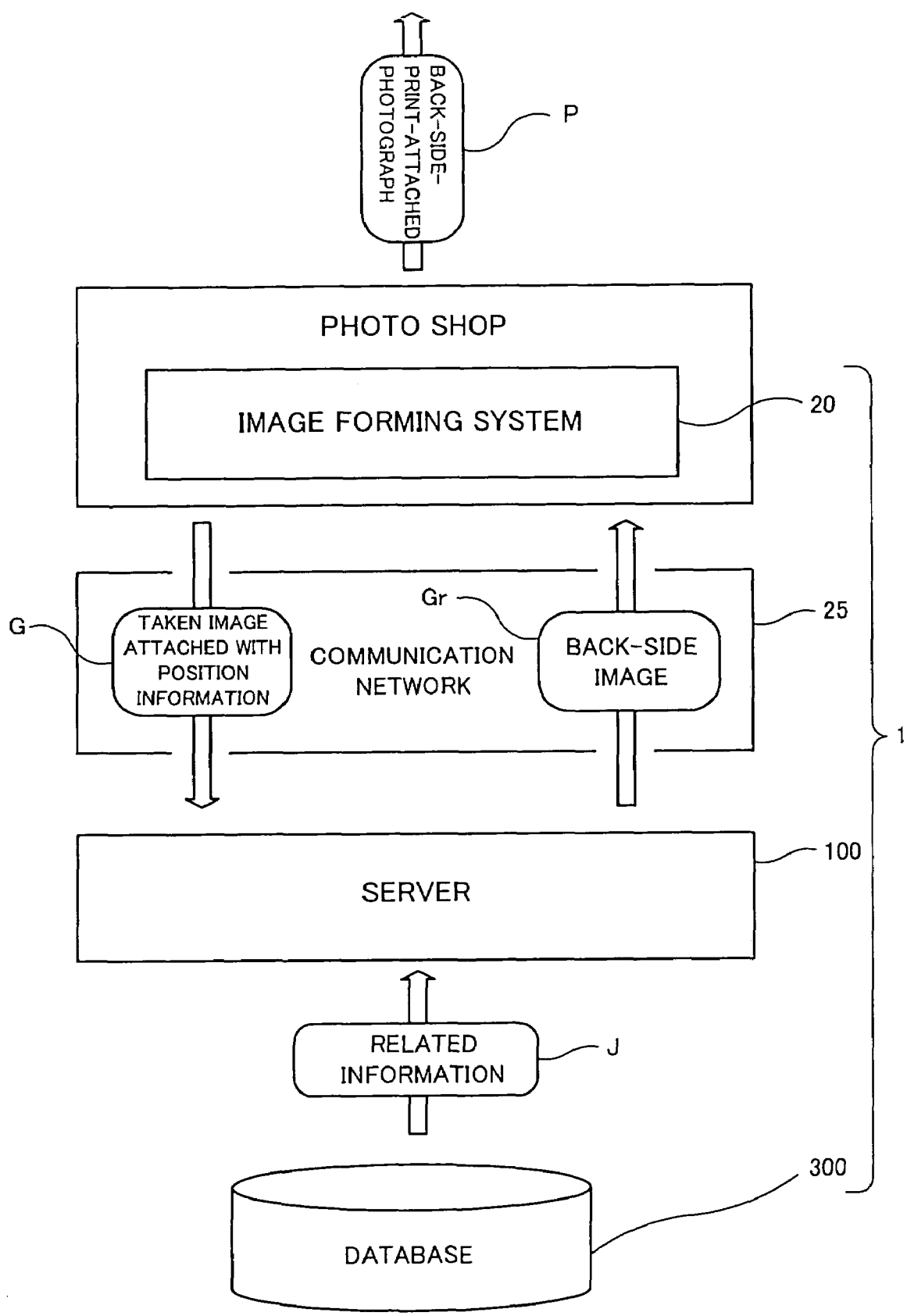
FIG. 2 is a block diagram showing an information provision system which is an embodiment of a print system of the present invention.

FIG. 2 is a block diagram showing an information provision system which is an embodiment of the print system of the present invention.

In an information provision system 1 shown in FIG. 2, one shop is identified based on the taken image G attached with the position information which has been brought to a photo shop. Then, related information J about the shop, for example, a shop guide is acquired. The "shop" is an example of a "place" stated in the present invention.

In the information provision system 1, an overhead view showing the position of the identified one shop is created, and furthermore, a back-side image Gr constituted by the overhead view and the related information J is created. Finally, the taken image G is printed on the front side of a sheet of recording paper, and the back-side image Gr is printed on the back side of the paper to create a backside-print-attached photograph P. The information provision system 1 is configured by a server 100, an image forming system 20, a communication network 25 and a database 300.

Here, the server 100 operates as a first embodiment of an information provision apparatus of the present invention as described later. The image forming system 20 corresponds to an example of a printer stated in the present invention.

In the database 300, there are stored, in association with each of various shops, one or more pieces of related information J and one or more reference images in which an advertising display, the appearance and the like showing the characteristics of the shop are shown. In the information provision system 1, related information J about an identified shop is acquired from the database 300. Furthermore, in the database 300, there are also stored a three-dimensional map showing an area including all the various shops described above, by means of the latitude, the longitude and the altitude. In the information provision system 1, the overhead view described above is created from this three-dimensional map.

Details of the database 300 and the overhead view will be described later.

In the information provision system 1 shown in FIG. 2, a photographer orders a print from a photo shop and receives a back-side-print-attached photograph P with a taken image G printed on the front side and a back-side image Gr, which includes related information J about one shop identified in association with the taken image G, printed on the backside.

Next, details of each of the server 100 and the image forming system 20 shown in FIG. 2 will be described.

First, the image forming system 20 will be described.

Figure 3:
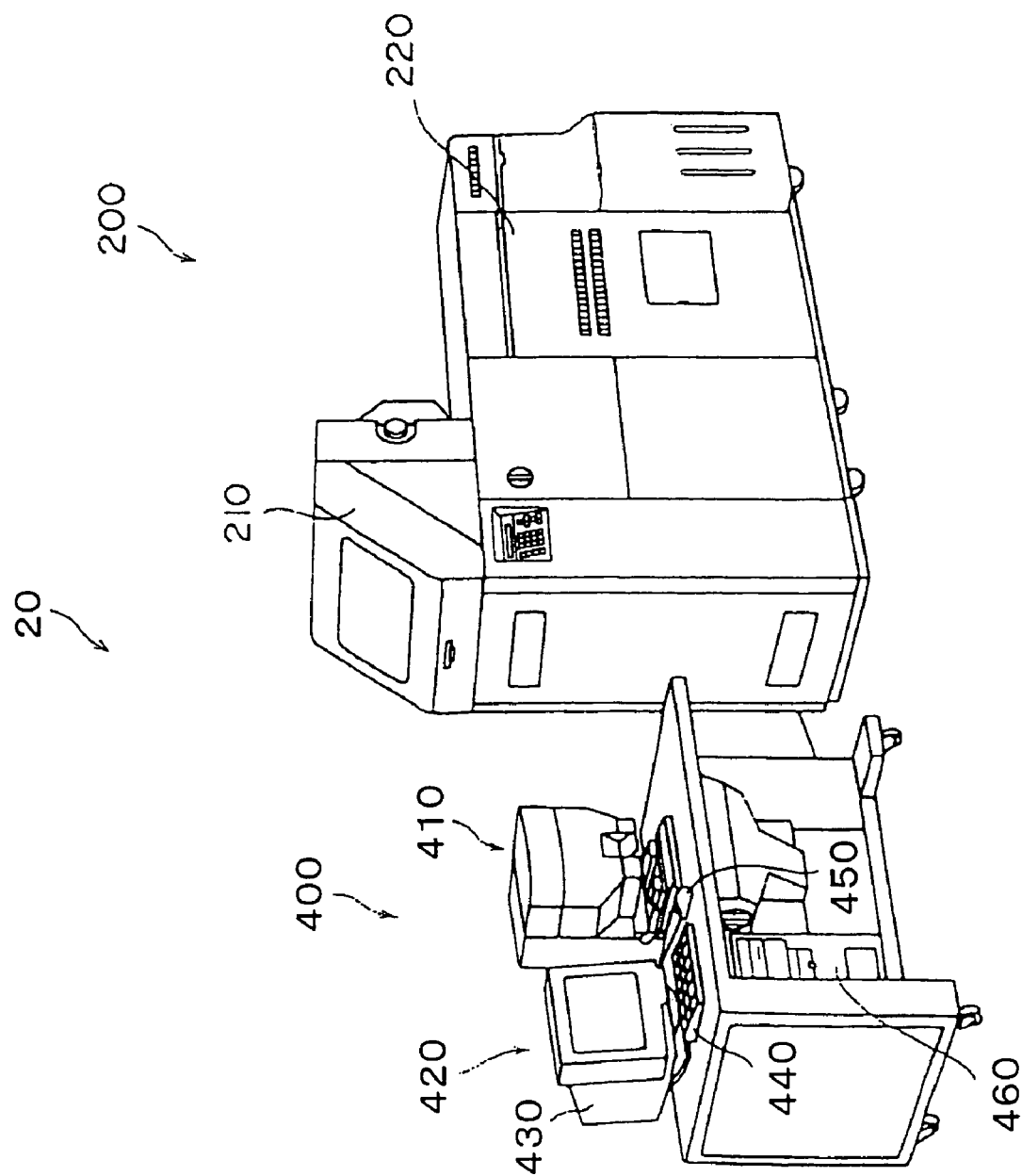
FIG. 3 is an external perspective view of an image forming system for printing a taken image.

FIG. 3 is an external perspective view of an image forming system for printing a taken image.

The image forming system 20 is an apparatus for performing predetermined image correction processing on a taken image which has been inputted, and then recording the taken image on a photograph, a CD-ROM, or the like. Furthermore, in the image forming system 20, if the back-side image described above is inputted together with the taken image, creation of the back-side-print-attached photograph P described above is performed.

The image forming system 20 is configured by an image input machine 400 and a printer 200.

The image input machine 400 is provided with a scanner 410 which photoelectrically and sequentially reads, from a developed film, each frame of multiple taken images recorded on the film, and an image processing apparatus 420 which performs predetermined image correction processing for the taken images.

The image processing apparatus 420 is provided with a body 460 in which a CPU, a hard disk and the like are included, a CRT display 430 which displays an image or a character string on the display screen in response to an instruction from the body 460, a keyboard 440 for inputting a user instruction or character information into the computer, a mouse 450 which, by specifying any position on the display screen of the CRT display 430, inputs an instruction corresponding to an icon or the like displayed at the position.

The image processing apparatus 420 is provided with a function as an image correction apparatus for performing predetermined image correction processing for a taken image which has been inputted. As the image correction processing, there are included processing for correcting a fogged image, in which an image taken under a fluorescent light is wholly whitish, processing for modifying the image of red eye or golden eye, in which eyes are shown in red or golden due to reflection of a flash at the depth of retina, processing for modifying the image of closed eyes due to a flash, modifying the color of the sky or the skin to be a visually favorable color, tone correction processing and the like.

The printer 200 is a printer to which an electrophotographic method for forming an image on paper with toner is applied. The printer 200 is provided with a control section 210 which controls various components constituting the printer 200, and an image creation section 220 which forms a toner image on paper.

Now, explanation will be made on the configuration of the printer 200 and a sequence of procedure for printing a taken image or a backside image communicated to the printer as a photograph.

Figure 4:
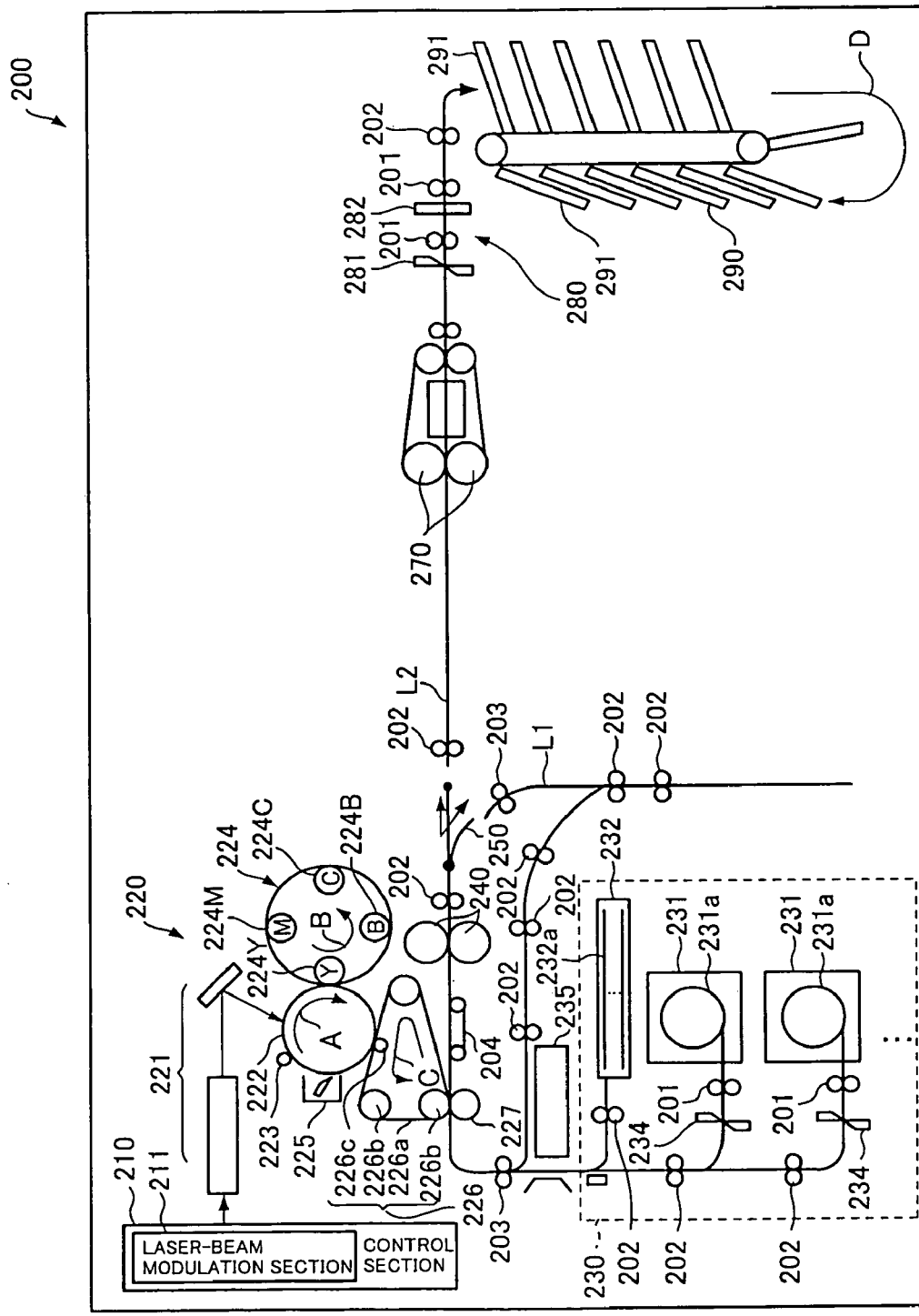
FIG. 4 is a schematic diagram of the internal structure of the printer shown in FIG. 3.

FIG. 4 is a schematic diagram of the internal structure of the printer shown in FIG. 3.

The printer 200 is a printer which forms an image with the use of toners of four colors of yellow (Y), magenta (M), cyan (C) and black (B), and it is capable of printing a full-color image constituted by toner images of the four colors in addition to printing a single-color image.

In a laser-beam modulation section 211 provided in the control section 210, which is also shown in FIG. 3, a laser beam emitted from a laser is modulated based on a taken image sent from the image processing apparatus 420.

The surface of an image holding roll 222 which rotates in the direction of an arrow A is charged by a charging roll 223, and the charged surface of the image holding roll 222 is scanned and exposed with the modulated laser beam by an exposure section 221. Thereby, an electrostatic latent image by predetermined surface potential is formed on the surface of the image holding roll 222.

In a development unit 224, there are provided development devices 224Y, 224M, 224C and 224B for Y, M, C and B colors, respectively, which are arranged at an interval of 90°. The development unit 224 rotates in the direction an arrow B for 90° to cause any of the development devices 224Y, 224M, 224C and 224B to be close to and against the image holding roll 222 with a slight distance kept therebetween. Then, toner is electrostatically attached to the electrostatic latent image formed on the surface of the image holding roll 222 from the development device located close to and against the image holding roll 222, so that a toner image of a color corresponding to the development device is formed on the surface of the image holding roll 222.

An intermediate transfer section 226 is configured so that an intermediate transfer belt 226a is movably stretched in the direction of an arrow C around stretching rolls 226b arranged inside the intermediate transfer belt 226a. Furthermore, a primary transfer roll 226c is arranged at the primary transfer position where the intermediate transfer belt 226a and the image holding roll 222 come closest to each other, and transfer voltage is applied to the intermediate transfer belt 226a by this primary transfer roll 226c. The toner image formed on the surface of the image holding roll 222 is transferred to the intermediate transfer belt 226a by the transfer voltage at the primary transfer position.

In the case where an image to be formed is a color image, an electrostatic latent image for yellow (Y) is formed on the surface of the image holding roll 222 by the exposure section 221 first. Then, toner is absorbed to the electrostatic latent image from the development device 224Y for yellow located close to and against the image holding roll 222 by rotation of the development unit 224, and a yellow toner image is formed on the surface of the image holding roll 222. Then, the yellow toner image is transferred to the intermediate transfer belt 226a. After that, an electrostatic latent image for magenta (M) is formed on the surface of the image holding roll 222 from which residual toner has been removed by a cleaner 225, by the exposure section 221. In this case, toner is absorbed to the electrostatic latent image from the development device 224M for magenta located close to and against the image holding roll 222 by rotation of the development unit 224 by 90°, and a magenta toner image is formed on the surface of the image holding roll 222. Then, the magenta toner image is transferred to the intermediate transfer belt 226a to be overlapped on the yellow toner image already transferred. Then, through a similar operation, the remaining cyan (C) and black (B) toner images are sequentially transferred onto the intermediate transfer belt 226a. Here, the stretching rolls 226b are controlled by the control section so that the toner images of the respective colors which are sequentially transferred are accurately overlapped with one another.

In the case where an image to be formed is a monochrome image, only a black (B) toner image is transferred to the intermediate transfer belt 226a through an operation similar to that described above.

A medium supply section 230 which supplies recording paper to an image creation section 220 is provided with a roll paper containing section 231 for storing roll paper 231a and a sheet containing section 232 for storing recording sheets 232a already cut.

The roll paper 231a stored in the roll paper containing section 231 is drawn out by a positioning roll 201 and cut into a predetermined size by a roll paper cutter 234. The cut recording paper or a recording sheet 232a drawn out from the sheet containing section 232 is carried through a carriage path formed by multiple carriage roles 202. The carriage paths from the roll paper containing section 231 and the sheet containing section 232 join together into one path at the downstream side, and there is arranged on the one path a print head 235 for printing the image-taking time and date and the like on the margin of the recording paper carried thereto.

The recording paper for which printing on the margin has been finished is carried to a secondary transfer roll 227 of the image creation section 220 by a resist roll 203 in exact timing, and the toner image already formed on the intermediate transfer belt 226a is transferred to the carried recording paper. As a result, toner images are formed on the surface of the recording paper.

Through the procedure as described above, the recording paper with the toner images transferred on one side thereof is carried to a primary fixing section 240 by a carriage belt 204. When heating and pressure processings are performed for the recording paper at the primary fixing section 240, the toner images are fixed on the recording paper.

The recording paper for which processings have been performed at the primary fixing section 240 is allocated and guided by a guide section 250 to a first carriage path L1 for returning the recording paper to the resist roll 203 or a second carriage path L2 to a secondary fixing section 270. The first carriage path L1 is a path for reversing and returning recording paper so that a toner image is fixed on the side opposite to the surface where a toner image has been fixed first. The second carriage path L2 is a path for performing further processing for recording paper to obtain high image quality corresponding to a photograph image level.

If the backside image is sent from the image processing apparatus 420 together with a taken image, both-side print is specified by the operator. In this case, the recording paper is guided to the first carriage path L1 after a toner image based on the taken image is formed on one side. The recording paper carried by the multiple carriage roles 202 along the first carriage path L1 is reversed and carried to the resist roll 203, and it is further re-carried to the secondary transfer roll 227. When the recording paper is carried to the secondary transfer roll 227, the sequence of image forming processings described above is performed for the backside of the recording paper, and a toner image based on the backside image is formed on the backside.

The recording paper for which primary fixing is finished and on which a toner image has been formed on both sides or one side thereof is guided to the second carriage path L2. The recording paper guided to the second carriage path L2 is carried to the secondary fixing section 270 arranged on the second carriage path L2.

At the secondary fixing section 270, the toner image fixed on the recording paper at the primary fixing section 240 is heated and melted first, and the surface of the melted toner image is pressed to a fixing belt having a smooth and glossy surface. Furthermore, the recording paper sticking to the glossy surface is cooled, and thereby the toner image on the recording paper is uniformly coagulated, and a high-quality image with gloss similar to that of a photograph image can be obtained.

The recording paper which has passed the secondary fixing section 270 is carried to an XY cutter 280 arranged at the downstream side of the second carriage path L2. The XY cutter 280 is configured by a first cutter 281 for cutting recording paper vertically to the carriage direction and a second cutter 282 for cutting recording paper along the carriage direction, and the first cutter 281 and the second cutter 282 are serially arranged on the carriage path. There are arranged positioning rolls 201 between the first cutter 281 and the second cutter 282, and at the downstream side of the second cutter 282, and these positioning rolls 201 position recording paper relative to the XY cutter 280. The positioning of recording paper by these positioning rolls 201 is performed by the control section 210 controlling these positioning rolls 201. The recording paper cut by the XY cutter 280 is immediately carried to a sorter 290 and stacked to stack sections 291 sequentially carried in the direction of an arrow D.

In this manner, in the printer 200, a toner image having a quality of a photograph is formed on paper.

Next, the server 100 shown in FIG. 2 will be described.

Figure 5:
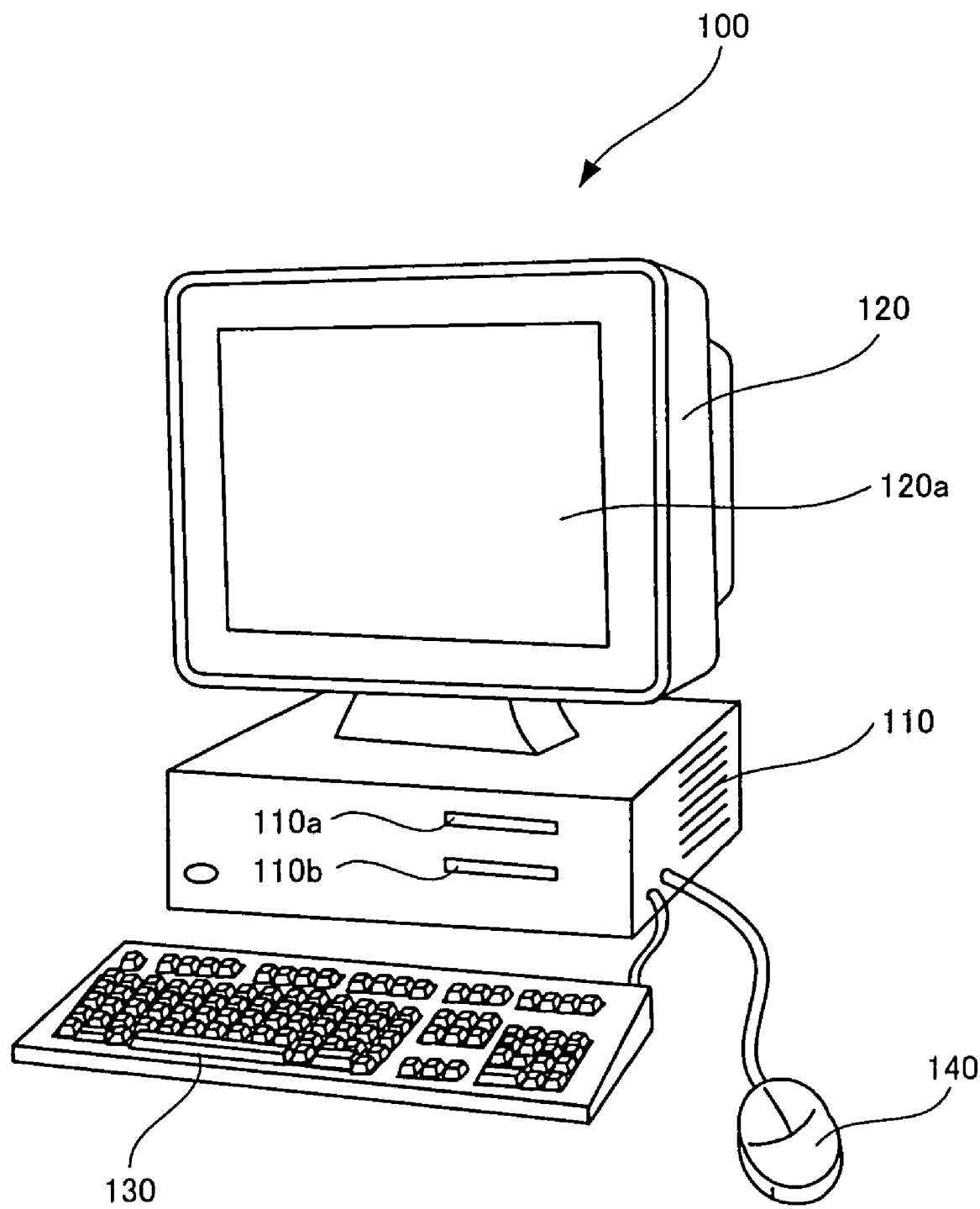
FIG. 5 is an external perspective view of a server.
Figure 6:
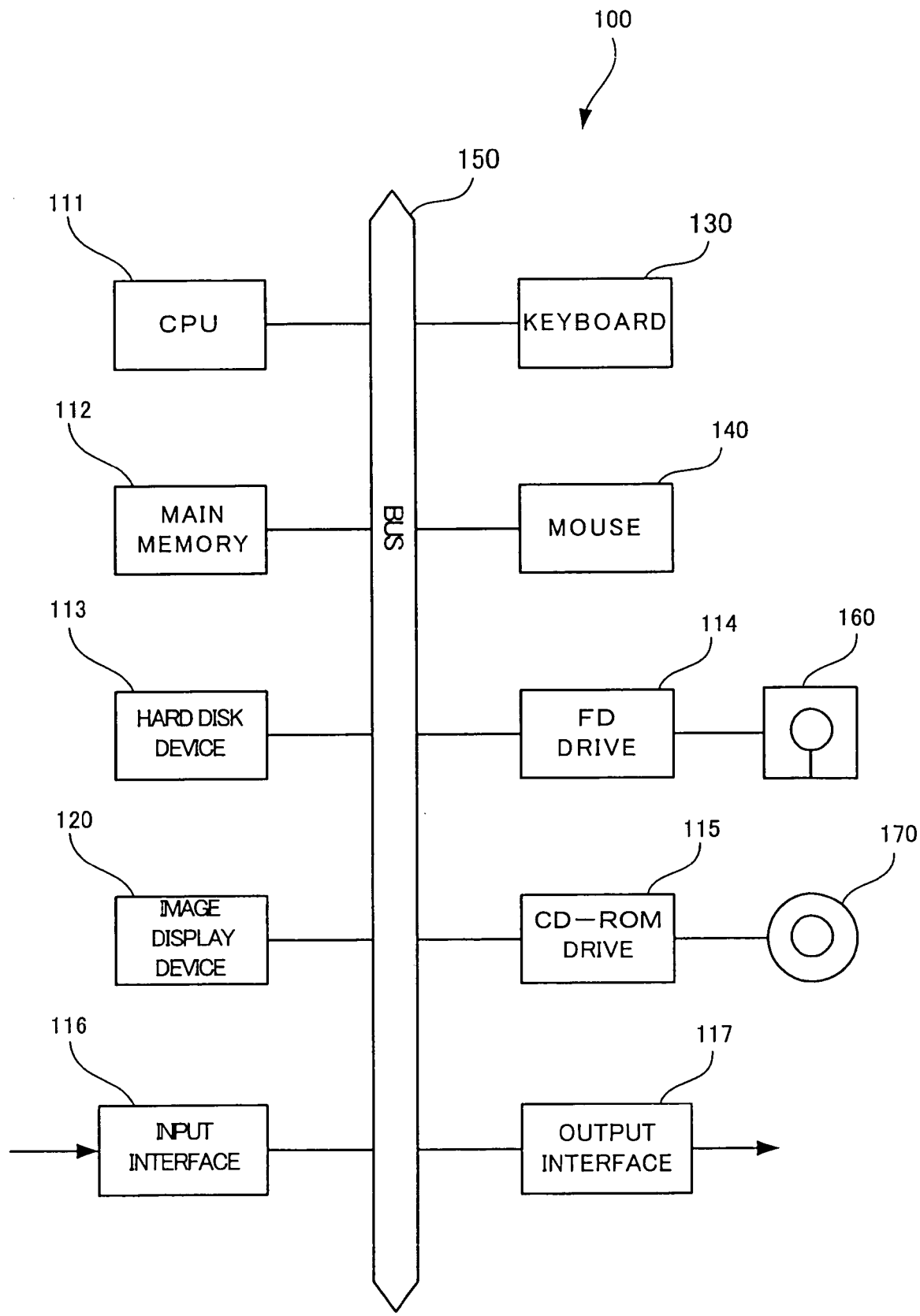
FIG. 6 is a hardware configuration diagram of the server.

FIG. 5 is an external perspective view of a server, and FIG. 6 is a hardware configuration diagram of the server.

As the external configuration, the server 100 is provided with a body apparatus 110, an image display device 120 for displaying an image on a display screen 120*a* in response to an instruction from the body apparatus 110, a keyboard 130 for inputting various information corresponding to key operations into the body apparatus 110, and a mouse 140 for specifying any position on the display screen 120*a* and thereby inputting an instruction corresponding to what is displayed at the position, such as an icon. As the external configuration, the body apparatus 110 is provided with an FD mounting port 110*a* for mounting a flexible disk (hereinafter abbreviated as an FD) and a CD-ROM mounting port 110*b* for mounting a CD-ROM.

As shown in FIG. 6, the body apparatus 110 includes a CPU 111 which executes various programs, a main memory 112 on which a program stored in a hard disk device 113 is read and developed to be executed by the CPU 111, the hard disk device 113 in which various programs and data are stored, an FD drive 114 in which an FD 160 is to be mounted and which accesses the mounted FD 160, a CD-ROM drive 115 in which a CD-ROM 170 is to be mounted and which accesses the mounted CD-ROM 170, an input interface 116 which receives the taken image G attached with position information or receives the related information from the database 300, and an output interface 117 which outputs the related information. These various components and the image display device 120, the keyboard 130 and the mouse 140 which are also shown in FIG. 5 are connected to one another via a bus 150.

Here, in the CD-ROM 170, there is stored an information provision program which causes the server 100 to operate as a first embodiment of the information provision apparatus of the present invention. The CD-ROM 170 in which the information provision program is stored corresponds to a first embodiment of the information provision program of the present invention. The CD-ROM 170 is mounted in the CD-ROM drive 115, and the information provision program stored in the CD-ROM 170 is uploaded to the server 100 and stored in the hard disk device 113. Then, by this information provision program being activated and executed, the server 100 shown in FIG. 5 operates as the first embodiment of the information provision apparatus of the present invention.

Next, description will be made on the first embodiment of the information provision program storage medium of the present invention, the program stored on which is to be executed in this server 100.

Figure 7:
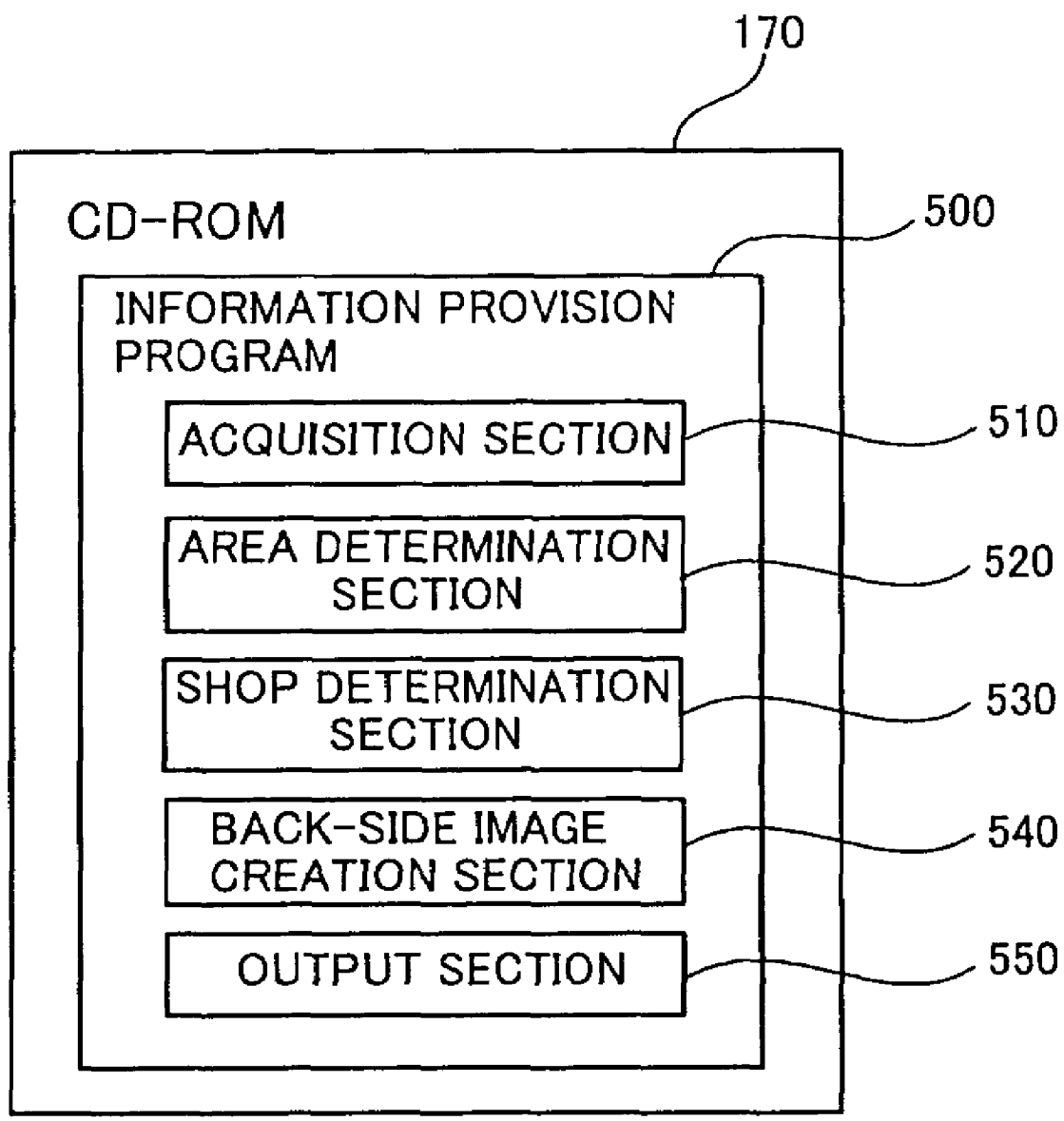
FIG. 7 is a conceptual diagram showing a CD-ROM which is a first embodiment of an information provision program storage medium of the present invention.

FIG. 7 is a conceptual diagram showing a CD-ROM which is a first embodiment of an information provision program storage medium of the present invention.

In the CD-ROM 170 shown in FIG. 7, there is stored an information provision program 500, and it corresponds to the first embodiment of the information provision program of the present invention.

The information provision program 500 is configured by an acquisition section 510, an area determination section 520, a shop determination section 530, a backside image creation section 540 and an output section 550. Each of the sections of the information provision program 500 will be described together with the operation of each section of the first embodiment of the information provision apparatus of the present invention.

Figure 8:
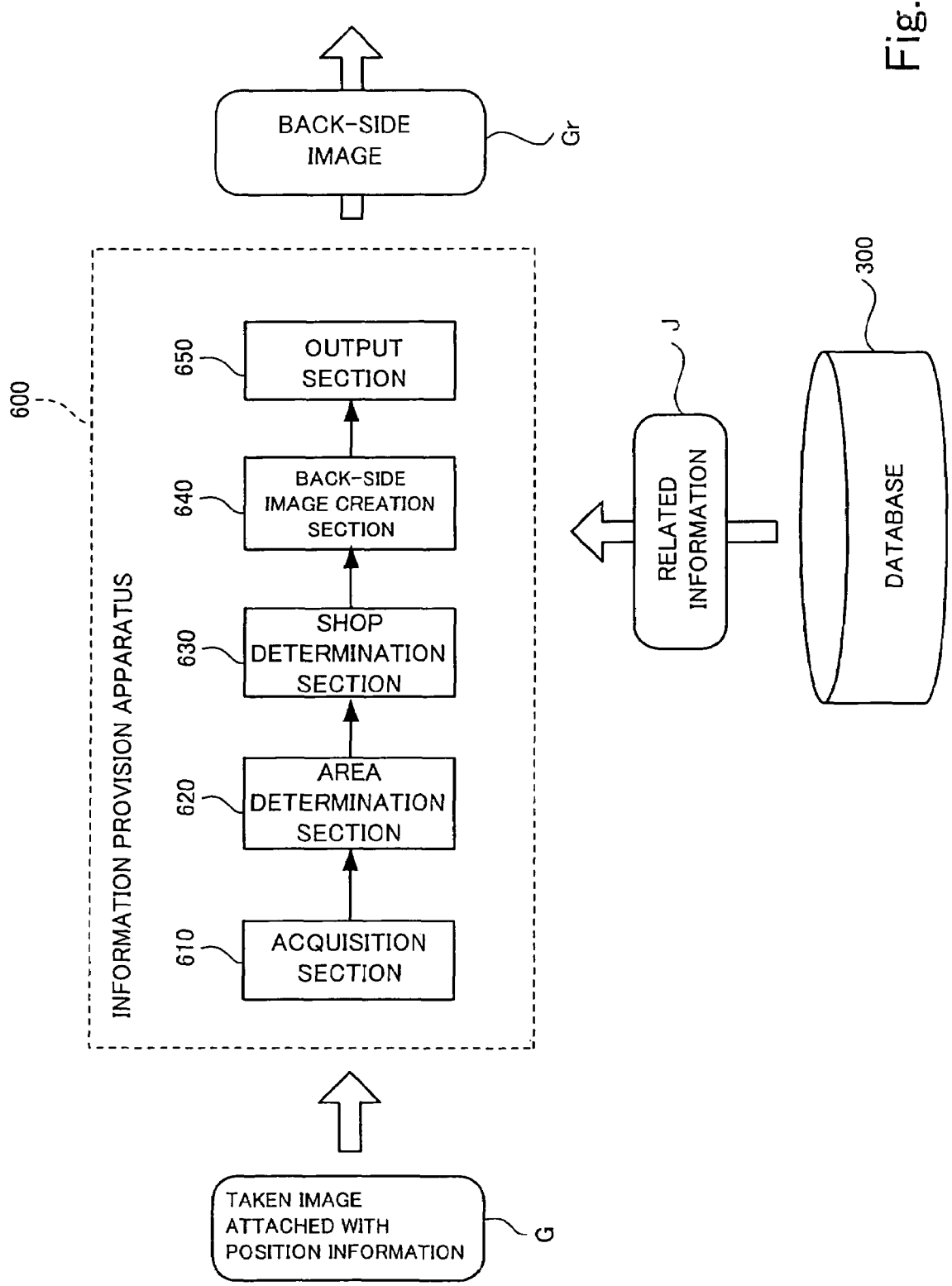
FIG. 8 is a functional block diagram showing functions to be performed when the information provision program storage medium shown in FIG. 7 is installed in the server shown in FIGS. 5 and 6, and the server is caused to operate as a first embodiment of an information provision apparatus of the present invention.

FIG. 8 is a functional block diagram showing functions to be performed when the information provision program shown in FIG. 7 is installed in the server shown in FIGS. 5 and 6 and the server is caused to operate as a first embodiment of an information provision apparatus of the present invention.

FIG. 8 shows the database 300, which is also shown in FIG. 2, in addition to an information provision apparatus 600, which is the first embodiment of the information provision apparatus of the present invention.

The information provision apparatus 600 shown in FIG. 8 identifies one shop based on a taken image G attached with position information. It plays a role of acquiring related information J about the shop from the database 300 to create an overhead view showing the one shop and further creating and outputting a back-side image Gr constituted by the overhead view and the related information J.

The information provision apparatus 600 is provided with an acquisition section 610, an area determination section 620, a shop determination section 630, a backside image creation section 640 and an output section 650. Here, the acquisition section 610, the area determination section 620, the shop determination section 630, the back-side image creation section 640 and the output section 650 correspond to examples of the acquisition section, the area determination section, the place determination section, the overhead view creation section and the output section stated in the present invention, respectively.

When the information provision program 500 shown in FIG. 7 is installed in the server 100 shown in FIGS. 5 and 6, the acquisition section 510 of the information provision program 500 configures the acquisition section 610 shown in FIG. 8. Similarly, the area determination section 520 configures the area determination section 620; the shop determination section 530 configures the shop determination section 630; the backside image creation section 540 configures the backside image creation section 640; and the output section 550 configures the output section 650.

A taken image G attached with position information, which has been obtained by image taking by means of the camera-equipped mobile phone 30 of FIG. 1, is sent to the acquisition section 610 from a photo shop from which the photographer ordered a print, via the communication network 25, as shown in FIG. 2.

The area determination section 620 identifies a building at a place indicated by the latitude and the longitude among the latitude, the longitude and the altitude indicated by the position information, on the three-dimensional map stored in the database 300 and determines one or more floors in the building corresponding to the altitude, as a search area.

The shop determination section 630 first reads each reference image associated with each shop in the search area among reference images stored in the database 300, from the database 300. Furthermore, the degree of similarity between each reference image and the taken image G is determined from pattern matching. If there exist more than one reference image with a predetermined or higher degree of similarity to the taken image G, then one shop is determined with which one reference image with the highest similarity to the taken image G among the reference images is associated.

The backside image creation section 640 creates an overhead view which is a three-dimensional map of an area of a predetermined range-including the one shop determined by the shop determination section 630 and in which the one shop is shown therein, with the use of the three-dimensional map stored in the database 300. Furthermore, related information J associated with the one shop determined by the shop determination section 630 is read from the database 300, and a back-side image Gr is created from the related information J and the overhead view.

The output section 650 outputs the backside image Gr created by the backside image creation section 640 to the image forming system 20 via the communication network 25 shown in FIG. 2.

Then, in the image forming system 20, the back-side-print-attached photograph P as described above is created based on the taken image G and the backside image Gr and provided for the photographer.

Next, details of the database 300 will be described.

Figure 9:
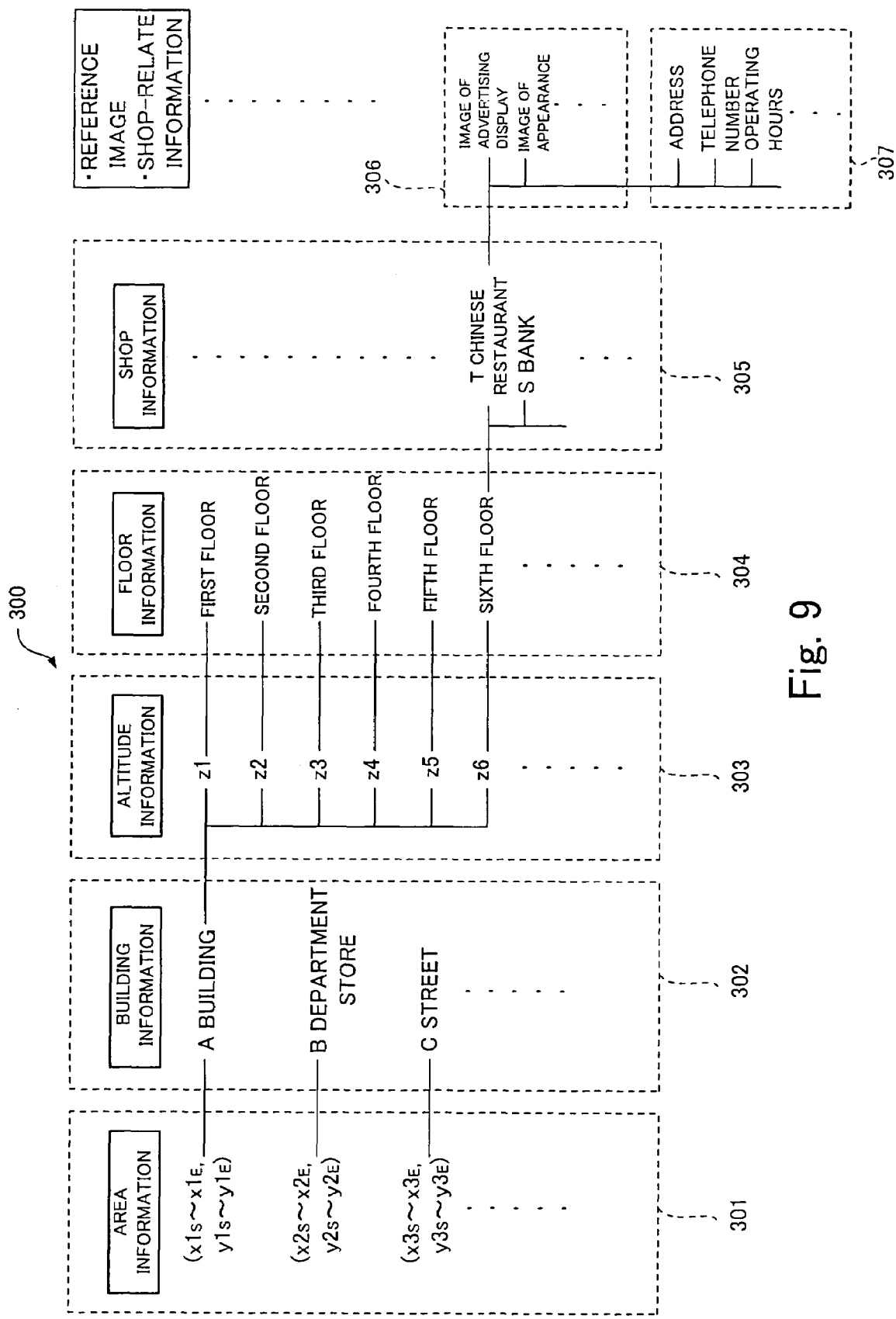
FIG. 9 shows an example of information stored in a database.

FIG. 9 shows an example of information stored in a database.

As shown in FIG. 9, there are stored in the database 300 area information 301, building information 302, altitude information 303, floor information 304, shop information 305, reference images 306 and shop-related information 307 to be described below in association with one another. The three-dimensional map described above is also stored in the database 300.

The area information 301 shows an area in which a building, a road or the like exists with ranges of latitude and longitude in the three-dimensional map described above. For example, as shown in FIG. 9, the area in which A Building is built is shown with ranges of latitude and longitude of ($x1_S$ to $x1_E$; $y1_S$ to $y1_E$); the area in which B Department Store is built is shown with ranges of latitude and longitude of ($x2_S$ to $x2_E$; $y2_S$ to $y2_E$); and the area in which C Street exists is shown with ranges of latitude and longitude of ($x3_S$ to $x3_E$; $y3_S$ to $y3_E$). Furthermore, in the database 300, building information 302 indicating the name of a building, a road or the like in the area shown by the area information 301 is associated with each area information 301.

Furthermore, as for building information 302 indicating the name of a building with a multiple-storied structure, such as a department store, among the building information 302, the same number of pieces of altitude information 303, in which the height of each floor of the building is indicated by the altitude in the three-dimensional map, as the number of floors of the building are associated with the building information 302. Furthermore, with each altitude information 303, floor information 304 showing a floor corresponding to the altitude indicated by the altitude information 303 is associated.

Furthermore, with each floor information 304, the same number of pieces of shop information 305, in which any of various shops on the floor such as T Chinese Restaurant and S Bank is shown, as the number of the shops on the floor is associated.

Furthermore, with each shop information 305, one or more reference images 306 showing the characteristics of a shop shown by the shop information 305, for example, an advertising display or the appearance of the shop, and one or more pieces of shop-related information 307 about the shop, for example, the address, the telephone number or the operating hours of the shop are associated.

In the information provision apparatus 600 shown in FIG. 8, one shop is identified based on a taken image G attached with position information. Then, shop-related information 307 associated with shop information 305 indicating the shop is read from the data base 300. This shop-related information 307 corresponds to an example of the related information stated in the present invention, as described as related information in FIG. 8.

Next, the outline of identification of a shop to be performed by the information provision apparatus 600 will be described.

Figure 10:
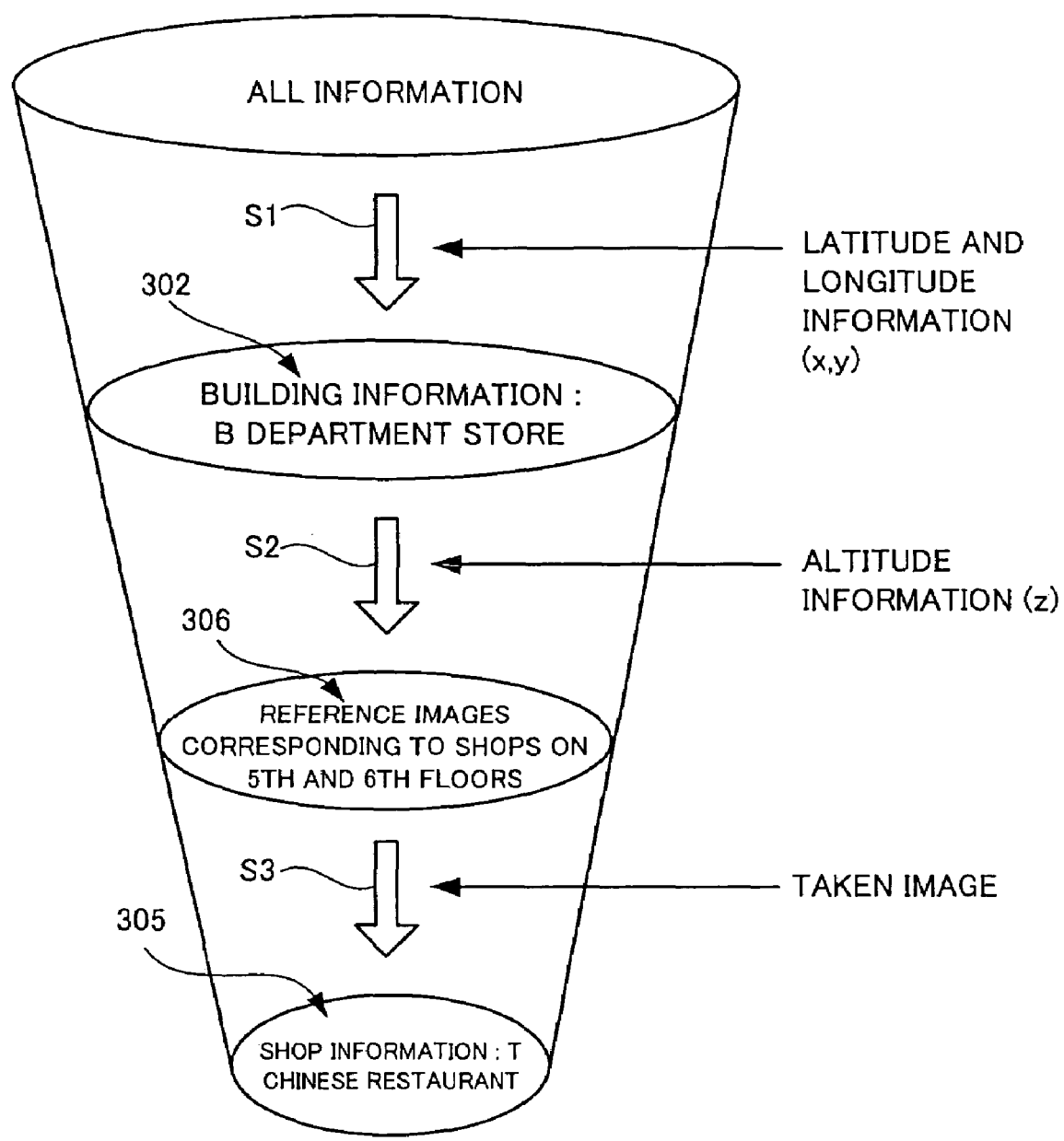
FIG. 10 is a schematic diagram showing the outline of identification of a shop performed by the information provision apparatus shown in FIG. 8.
Figure 11:
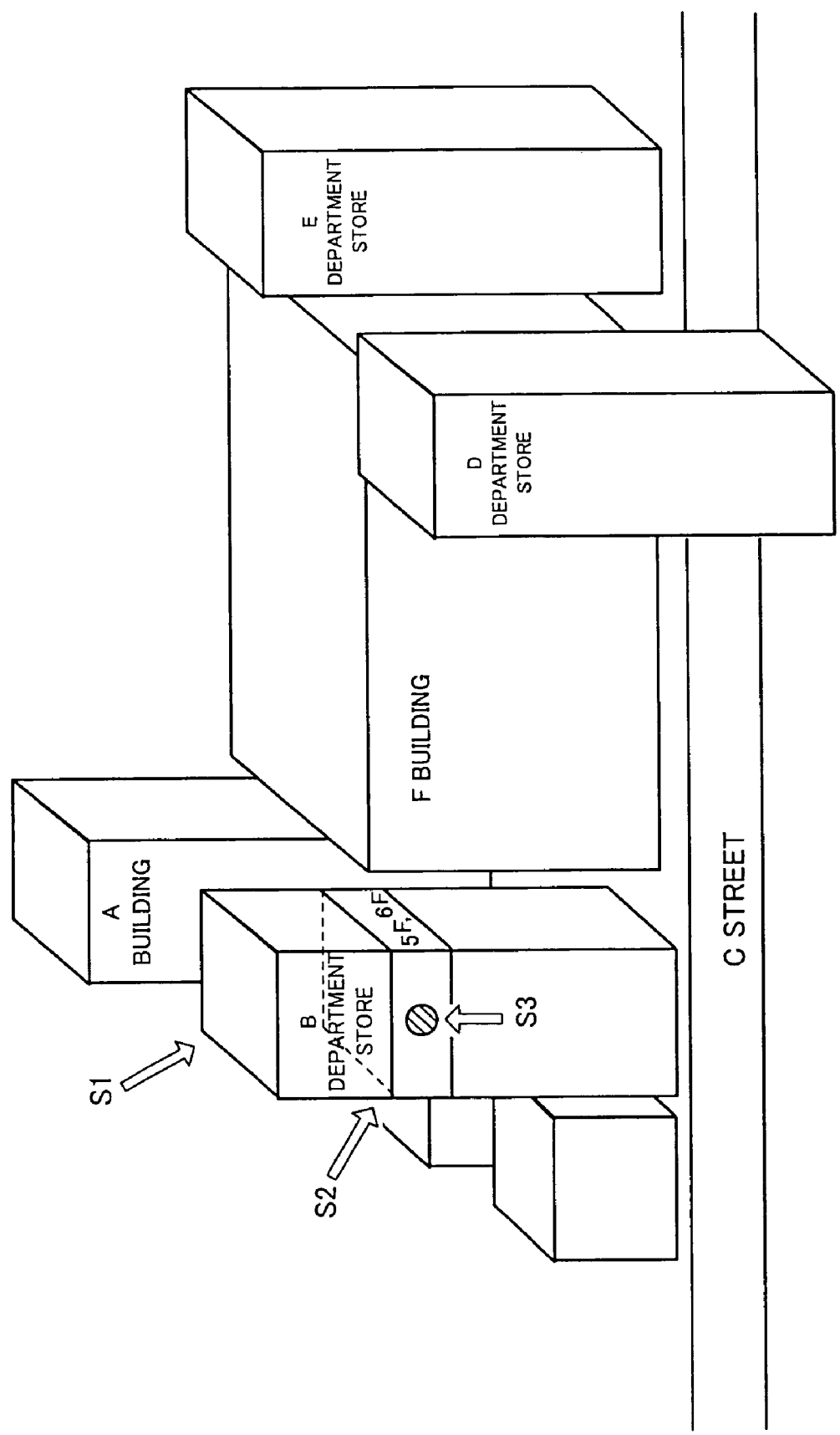
FIG. 11 shows the outline of the identification of a shop shown in FIG. 10 on a three-dimensional map.

FIG. 10 is a schematic diagram showing the outline of identification of a shop performed by the information provision apparatus shown in FIG. 8, and FIG. 11 shows the outline of the identification of a shop shown in FIG. 10 on a three-dimensional map. In the description below, the components shown in FIGS. 8 and 9 will be referred to without especially stating the figure numbers.

When a taken image attached with position information is sent to the information provision apparatus 600, one shop is identified through the three steps described below, and shop-related information 307 about the identified shop is read from the database 300.

First, at the first stage (step S1), latitude and longitude information (x, y) among the position information attached to the taken image is used. At this first stage (step S1), area information 301 indicating an area including the position indicated by the latitude and longitude information (x, y) is retrieved from multiple pieces of area information 301, and building information 302 associated with the retrieved area information 301 is acquired. In the example in FIGS. 10 and 11, building information 302 indicating B Department Store is acquired.

Next, at the second stage (step S2), altitude information (z) is used from among the position information. At this second stage (step S2), first, a predetermined altitude range including the altitude indicated by the altitude information (z) is set considering an error predicted by the GPS described above, and all pieces of altitude information 303 included in this altitude range are retrieved from multiple pieces of altitude information 303 associated with the building information 302 acquired by the processing of the first stage (step S1). Then, floor information 304 associated with the retrieved altitude information 303 is acquired. At this second stage (step S2), since all the pieces of altitude information 303 included in the altitude range are retrieved, pieces of floor information 304 corresponding to several floors, including the floor where image taking was actually performed by the photographer, are acquired without missing the floor even if an error is included in the altitude information (z). Furthermore, at this second stage (step S2), for each of multiple pieces of shop information 305 associated with the acquired pieces of floor information 304 corresponding to several floors, a reference image 306 associated therewith is read from the database 300. In the example in FIGS. 10 and 11, pieces of floor information 304 corresponding to fifth and sixth floors are acquired, and reference images 306 corresponding to shops on the floors are read.

Next, at the third step (step S3), in the case where there are one or more reference images with a predetermined or higher degree of similarity to the taken image, among the multiple reference images 306 read at the second stage (step S2), one shop is identified by determining a reference image 306 with the highest similarity to the taken image from among the reference images 306. In the example in FIGS. 10 and 11, T Chinese Restaurant is identified as the one shop.

When the shop is identified as described above, the information provision apparatus 600 reads shop-related information 307 about the shop from the database 300 and creates the backside image described above.

Next, details of the shop identification processing the outline of which has been described with reference to FIGS. 10 and 11 will be described with reference to flowcharts. In the description below, the components shown in FIGS. 8 and 9 will also be referred to without especially stating the figure numbers.

Figure 12:
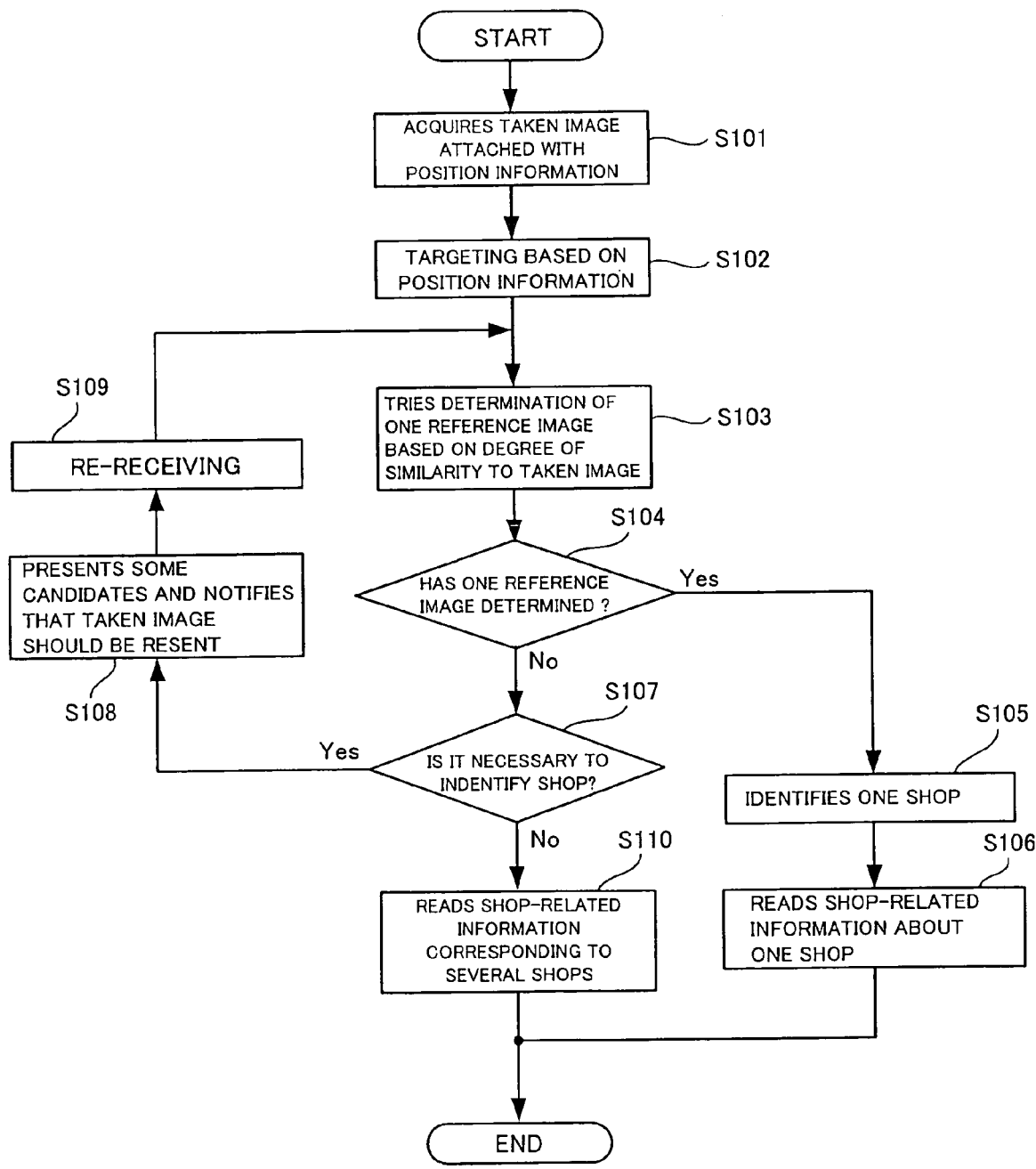
FIG. 12 is a flowchart showing processing for the identification of a shop.

FIG. 12 is a flowchart showing processing for the identification of a shop.

The processing shown by this flowchart starts when a taken image attached with position information, which has been obtained by a photographer with the use of the camera-equipped mobile phone 30 shown in FIG. 1, is sent to the information provision apparatus 600 from a photo shop via the communication network 25 (see FIG. 2).

When the processing starts, a taken image G is received first (step S101). Subsequently, a building where image taking was performed by the photographer and several floors in the building with a possibility that the image taking may have been performed are determined based on the latitude and longitude information (x, y) and the altitude information (z) described above. Furthermore, a reference image 306 associated with each of multiple stores existing on the several floors is read from the database 300 (step S102).

Then, the degree of similarity between each reference image 306 read by the processing of step S102 and the taken image is determined, and determination of one reference image 306 which has a predetermined or higher similarity to the taken image and which has the highest similarity, is tried (step S103). Then, it is determined by the processing of step S103 whether one reference image 306 has been determined or not (step S104).

If one reference image 306 is determined (determination by the processing of step S104: Yes), then a shop corresponding to the one reference image 306 is identified as one shop characterized by the object shown in the taken image (step S105). Furthermore, shop-related information 307 associated with shop information 305 indicating the one shop is read from the database 300 (step S106), and the processing shown by the flowchart ends.

On the other hand, if a reference image 306 with a predetermined or higher similarity to the taken image is not found by the processing of step S103, and one reference 306 is not determined (determination by the processing of step S104: No), then a message is sent to the photo shop inquiring about whether or not one shop should be necessarily identified (step S107).

If the content of a reply to the message sent by the processing of step S107 shows that identification of a shop is necessary (determination by the processing of step S106: Yes), then a message is sent to the photo shop which prompts the photo shop to perform any of sending a different taken image enabling identification of a shop and selecting one reference image from among reference images 306 already obtained at this stage to send back the reference image 306 (step S108). Reference image 306 candidates already obtained at this stage are sent together with this message. Then, a taken image resent or a reference image 306 returned in response to the message sent by the processing of step S108 is received (step S109).

After that, the taken image or the reference image received at step S109 is used to retry the determination of one reference image 306 by the processing of step S103. The processing of step S103 is repeated until it is determined by the processing of step S104 that one reference image 306 has been determined, and the processing shown by the flowchart ends after performing the processings through step S104 to step S106, or until a message to the effect that identification of a shop is not necessary is sent in response to the message sent by the processing of step S106 (determination by the processing of step S106: No), or until one of the reference images 306 sent as candidates is sent back by the processing of step S109. In this case, if the image received at step S109 is one of the reference images 306 sent as candidates, then the reference image 306 is determined as the one reference image 306 by the processing of step S103, and therefore, the processing shown by the flowchart ends after performing the processings through steps S104 to S106 described above.

If the content of the reply in response to the message sent by the processing of step S107 indicates that identification of a shop is not necessary (determination by the processing of step S107: No), then shop-related information 307 about all of shops associated with respective reference image 306 candidates already obtained at this stage is read from the database 300 (step S110), and the processing shown by the flowchart ends.

If one shop is identified and shop-related information 307 about the shop is read from the database 300 through the processings described above, there is created a back side image constituted by an overhead view and shop-related information 307.

Figure 13:
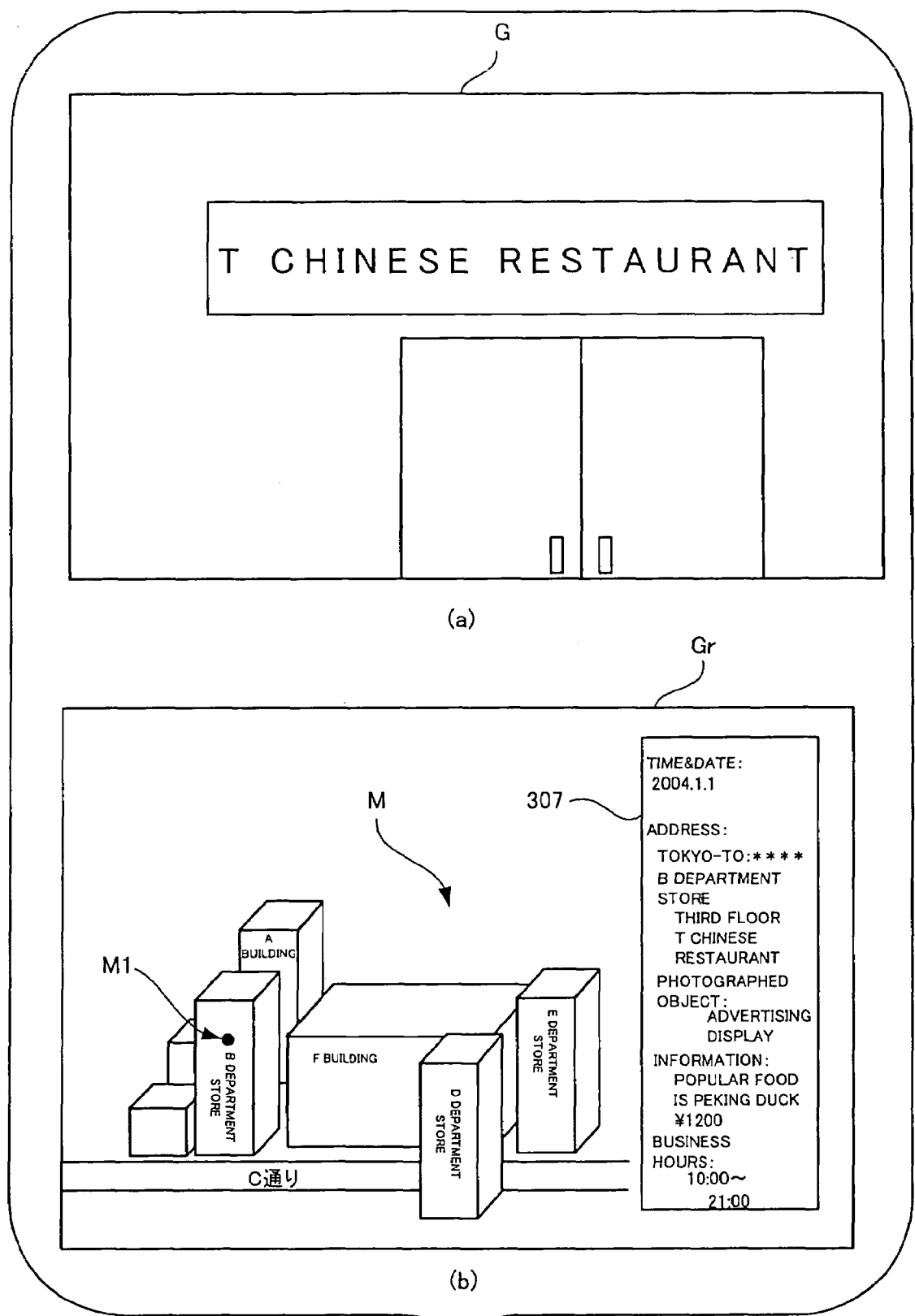
FIG. 13 shows an example of a taken image and an example of a back-side image for the taken image.

FIG. 13 shows an example of a taken image and an example of a backside image for the taken image. Part (a) of FIG. 13 shows an example of a taken image, and Part (b) of FIG. 13 shows an example of a backside image.

The taken image G shown in Part (a) of FIG. 13 is an image in which an advertising display is shown, and the back-side image Gr shown in Part (b) of FIG. 13 is an image constituted by an overhead view M showing the position of the shop as a point M1 in a predetermined range of a three-dimensional map and shop-related information 307 about the shop.

When one shop is identified by the shop identification processing described above, the overhead view M is created by arranging the position M1 indicating the position of the shop in part of a predetermined range, including the shop, of the three-dimensional map stored in the database 300. As shown in Part (b) of FIG. 13, the backside image Gr is constituted by the overhead view M with the shop-related information 307 shown at the right side thereof. As shown in FIG. 2, the backside image Gr is sent to the image forming system 20 of a photo shop via the communication network 25. Then, a back-side-print-attached photograph P is created by the image forming system 20 based on the taken image G and the backside image Gr.

On the other hand, if any one shop is not identified even by the shop identification processing described above, and shop-related information 307 about multiple shop candidates is read from the database 300, then the overhead view is omitted for print space, and a back-side image Gr in which multiple pieces of shop-related information 307 are listed up is created and sent to the image forming system 20 of the photo shop. In the image forming system 20, a back-side-print-attached photograph P, on which a back-side image consisting of a list of related information is printed, is created based on the taken image G and the back-side image Gr.

According to the first embodiment of the present invention described above with reference to FIGS. 1 to 13, it is possible to identify a shop characterized by an object shown in a taken image with a high accuracy, acquire information about the shop, create the back-side-print-attached photograph described above, which is a highly value-added photograph, based on the information and provide it for a customer.

Next, description will be made on a second embodiment of each of the information provision apparatus, the information provision program and the information program storage medium of the present invention.

The first embodiment of each of the information provision apparatus, the information provision program and the information provision program storage medium of the present invention is based on the information provision system 1 (see FIG. 2). That is, an embodiment of the print system of the present invention, in which one shop is identified based on a taken image attached with position information handed over from a photo shop, shop-related information about the shop is acquired, and a back-side image is created based on the shop-related information and sent to an image forming system so that a back-side-print-attached photograph is created by the image forming system.

However, a second embodiment of each of the information provision apparatus, the information provision program and the information provision program storage medium of the present invention is based on an information provision system different from the information provision system 1 described above, in which a taken image attached with position information is handed over from the camera-equipped mobile phone 30 (see FIG. 1) carried by a photographer, one shop is identified based on the taken image, shop-related information about the shop is acquired, and the shop-related information is sent to the photographer's camera-equipped mobile phone 30.

Figure 14:
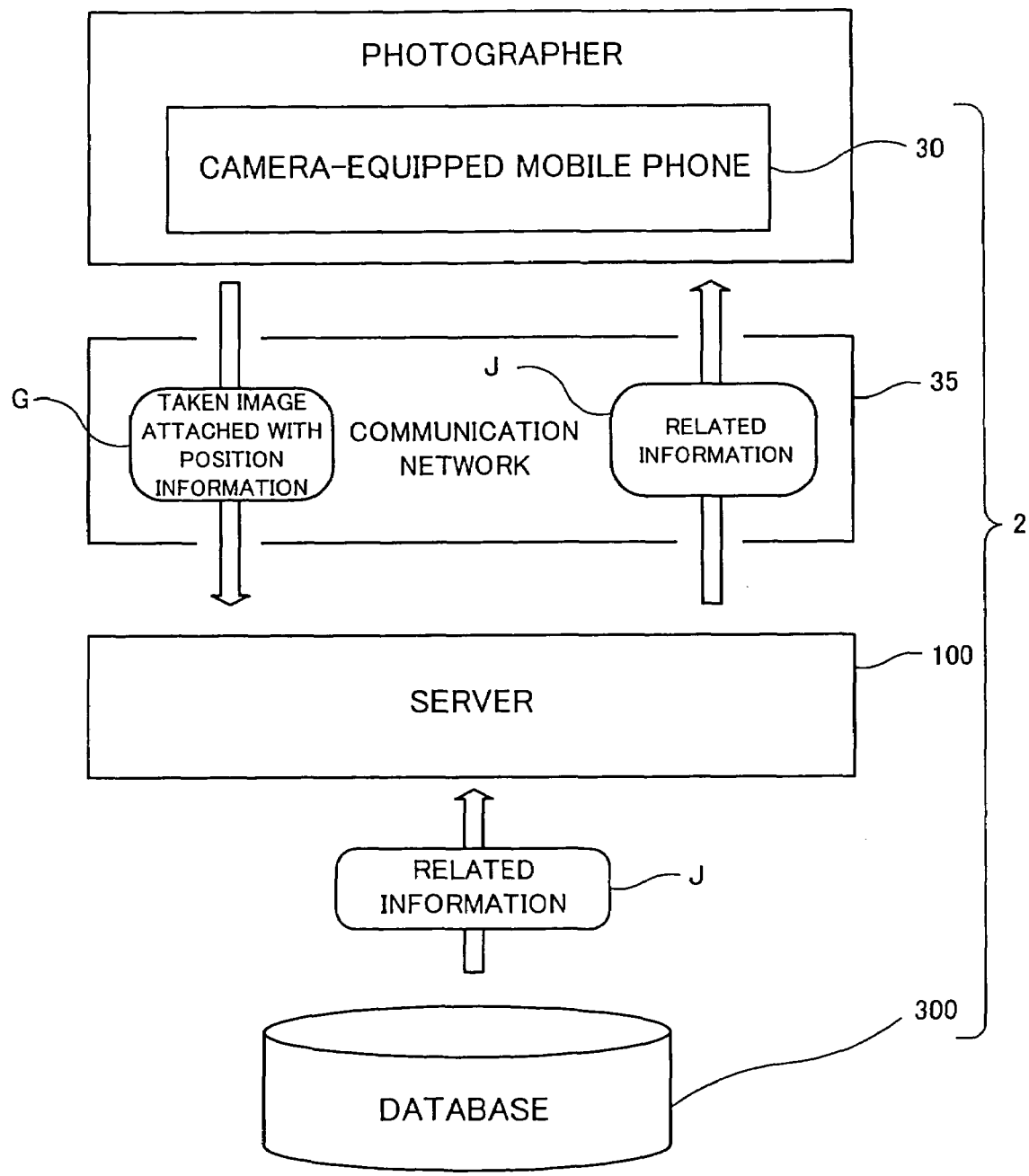
FIG. 14 is a block diagram showing an information provision system in which a taken image attached with position information is handed over from a camera-equipped mobile phone carried by a photographer, one shop is identified based on the taken image, shop-related information about the shop is acquired, and then the shop-related information is sent to the photographer's camera-equipped mobile phone.

FIG. 14 is a block diagram showing an information provision system in which a taken image attached with position information is handed over from a camera-equipped mobile phone carried by a photographer, one shop is identified based on the taken image, shop-related information about the shop is acquired, and then the shop-related information is sent to the photographer's camera-equipped mobile phone.

This information provision system 2 is provided with a server and a database equivalent to the server 100 and the database 300 shown in FIG. 2, respectively. Therefore, in FIG. 14, these server and database are given the same reference numerals as those in FIG. 2, and overlapped description will be omitted.

This information provision system 2 is configured by a server 100, a database 300 and a communication network 35. Here, the communication network 35 includes a mobile phone communication network and forms a path for information between the camera-equipped mobile phone 30 and the server 100. The server 100 is caused to operate as the second embodiment of the information provision apparatus of the present invention by the second embodiment of the information provision program of the present invention to be described later being activated and executed in the server 100.

In the information provision system 2 shown in FIG. 14, when a photographer takes an image of an object characterizing a shop, such as an advertising display, with the use of the camera-equipped mobile phone 30, and acquires a taken image G attached with position information, he/she sends the taken image G to the server 100 operating as the second embodiment of the information provision apparatus of the present invention via the communication network 35. Then, one shop is identified in the server 100; related information J about the one shop is read from the database 300; the related information is sent from the server 100 to the camera-equipped mobile phone 30 via the communication network 35. Thus, in this embodiment, the photographer can acquire related information J about a shop characterized by an object photographed by the camera-equipped mobile phone 30, by means of the camera-equipped mobile phone 30.

Next the second embodiment of the information provision program storage medium of the present invention will be described.

Figure 15:
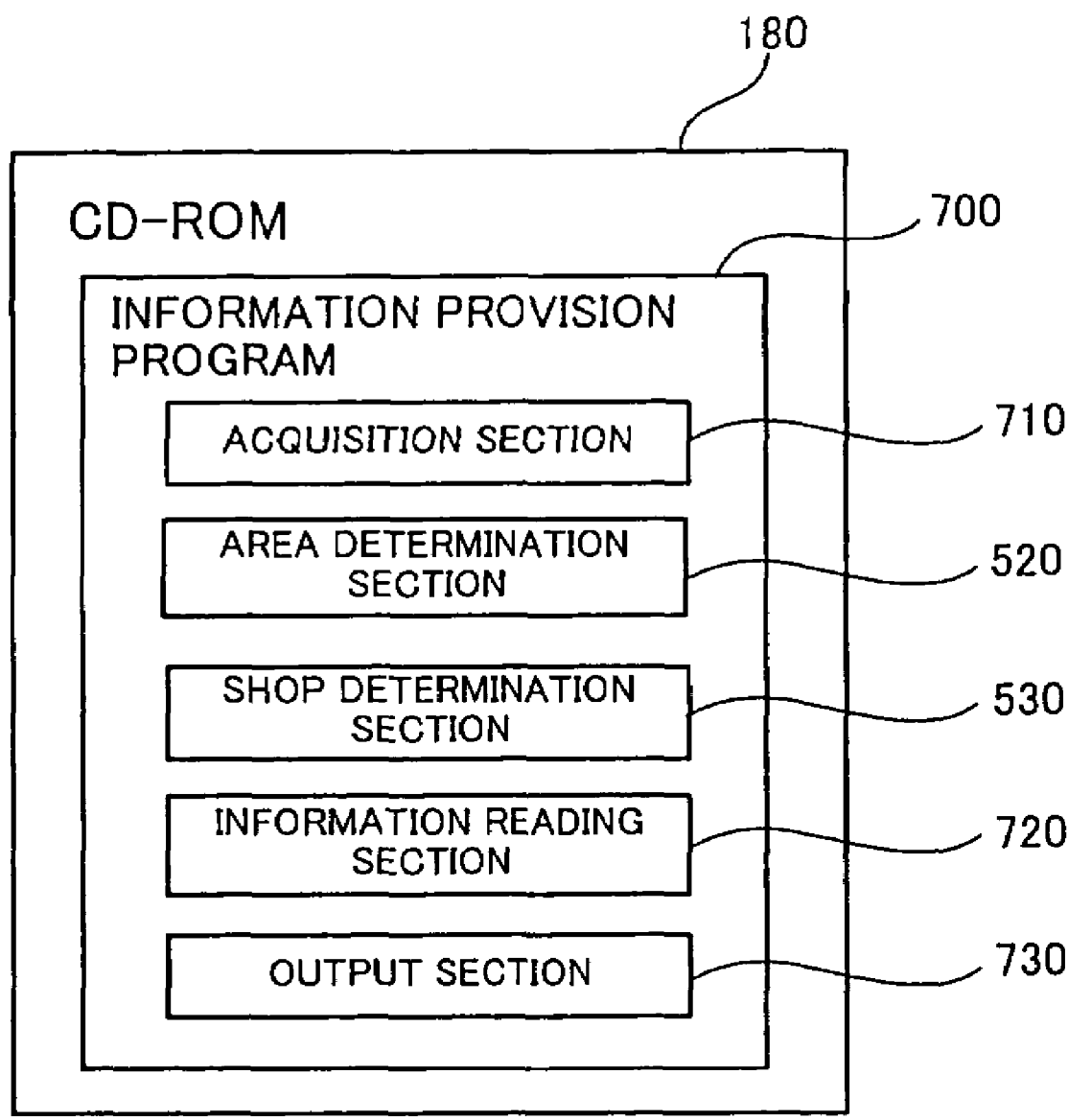
FIG. 15 is a conceptual diagram showing a CD-ROM which is a second embodiment of the information provision program storage medium of the present invention.

FIG. 15 is a conceptual diagram showing a CD-ROM 180, which is a second embodiment of the information provision program storage medium of the present invention.

In the CD-ROM 180 shown in FIG. 15, an information provision program 700 is stored, and it is equivalent to the second embodiment of the information provision program of the present invention. In FIG. 15, components equivalent to those shown in FIG. 7 are given the same reference numerals as those in FIG. 7.

The information provision program 700 is configured by an acquisition section 710, an area determination section 520, a shop determination section 530, an information reading section 720 and an output section 730. Details of each section of this information provision program 700 will be described together with the operation of each section of the second embodiment of the information provision apparatus of the present invention.

FIG. 16 is a functional block diagram showing functions to be performed when the information provision program shown in FIG. 15 is installed in the server shown in FIGS. 5 and 6 and the server is caused to operate as a second embodiment of the information provision apparatus of the present invention. In FIG. 16, components equivalent to those shown in FIG. 8 are given the same reference numerals as those in FIG. 8, and overlapped description will be omitted.

FIG. 16 shows the database 300 also shown in FIGS. 2 and 14, in addition to an information provision apparatus 800, which is the second embodiment of the information provision apparatus of the present invention.

The information provision apparatus 800 shown in FIG. 16 plays a role of identifying one shop based on a taken image G attached with position information and acquiring related information J about the shop from the database 300 to output it.

This information provision apparatus 800 is provided with an acquisition section 810, an area determination section 620, a shop determination section 630, an information reading section 820 and an output section 830. Here, the acquisition section 810 and the output section 830 in this embodiment are equivalent to examples of the acquisition section and the output section of the present invention, respectively.

When the information provision program 700 shown in FIG. 15 is installed in the server 100 shown in FIGS. 5 and 6, the acquisition section 710 of the information provision program 700 configures the information acquisition section 810 shown in FIG. 16. Similarly, the information reading section 720 configures the information reading section 820, and the output section 730 configures the output section 830.

As shown in FIG. 14, to the acquisition section 810, a taken image G attached with position information, which has been obtained by image taking by means of the camera-equipped mobile phone 30, is sent from the camera-equipped mobile phone 30 via the communication network 35.

Then, one shop is identified by the area determination section 620 and the shop determination section 630 constituting the information provision apparatus 800.

Related information J about the identified shop (equivalent to the shop-related information 307 in FIG. 9) is read by the information reading section 820 from the database 300.

The related information read by the information reading section 820 is sent to the camera-equipped mobile phone 30 by the output section 830 via the communication network 35.

Here, in the second embodiment of the information provision apparatus of the present invention also, only identification of some shop candidates may be performed by the area determination section 620 and the shop determination section 630 depending on the taken image G attached with position information, similarly to the first embodiment of the information provision apparatus of the present invention. In such a case, the user of the camera-equipped mobile phone 30 is inquired of about whether one shop should be necessarily identified or not.

If the user replies that one shop should be necessarily identified, then the user is instructed to perform any of the following two processings. That is, one processing is to send a different taken image G, and the other is to select one reference image from among reference images corresponding to candidates identified at the current stage, which are to be sent from the information provision apparatus 800, and send back the reference image. When one shop is identified through the processing, related information J about the shop is sent to the camera-equipped mobile phone 30.

On the other hand, if the user replies that identification of shops identified at the current stage is sufficient, then all related information J about candidates identified at the current stage is read from the database 300 by the information reading section 820, and all the related information J is sent to the camera-equipped mobile phone 30.

According to the second embodiment of the present invention described above with reference to FIGS. 14 to 16, it is possible to identify one shop based on a taken image G attached with position information, which has sent from the camera-equipped mobile phone 30 carried by the photographer and send information about the shop to the camera-equipped mobile phone 30 to provide the information for the customer.

Description has been made on the information provision system 1 which creates a back-side-print-attached photograph with a taken image printed on one surface of recording paper and with the above-described back-side image printed on the back side of the surface, as an embodiment of the print system of the present invention. However, the present invention is not limited thereto. For example, the print system of the present invention may create a pair of a photograph with a taken image printed thereon and recording paper with related information printed thereon. Alternatively, it may create one of a back-side-print-attached photograph described above and a pair of a photograph and recording paper, whichever the customer desires.

Two kinds of information provision apparatuses 600 and 800 that identify one shop based on a taken image have been described as embodiments of the information provision apparatus of the present invention. However, the present invention is not limited thereto. The information provision apparatus of the present invention may identify any target characterized by an object shown in a taken image. In this case, a database is prepared in which a reference image and related information associated with the target are stored.

In the above description, character information such as the address or the business hours of a shop has been used as an example of the related information stated in the present invention. However, the present invention is not limited thereto. The related information stated in the present invention may be an image in which the appearance of a shop or a new product is shown, for example.

What is claimed is:

1. An information provision apparatus comprising:
an acquisition section which acquires a taken image obtained by image taking and position information indicating the image taking position in the image taking;
an area determination section which determines a particular search area including the image taking position indicated by the position information;
a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and
an output section which outputs information associated with the one place determined by the place determination section.

2. The information provision apparatus according to claim 1, wherein the output section outputs the information associated with the one place to a printer.

3. The information provision apparatus according to claim 1, wherein
the acquisition section acquires the taken image and the position information from a provision source via a communication network, and
the output section outputs the information associated with the one place to the provision source via the communication network.

4. The information provision apparatus according to claim 1, wherein
the position information indicates the longitude, the latitude and the altitude of the image taking position; and
the area determination section identifies a building located at a place indicated by the latitude and the longitude indicated by the position information, and furthermore determines one or more floors of the identified building corresponding to the altitudes indicated by the position information as the search area.

5. The information provision apparatus according to claim 1, comprising:
an overhead view creation section which creates an overhead view showing the one place determined by the place determination section; wherein
the output section outputs the overhead view created by the overhead view creation section in addition to the information.

6. A print system comprising:
an information provision apparatus comprising:
an acquisition section which acquires a taken image obtained by image taking and position information indicating the image taking position in the image taking;
an area determination section which determines a particular search area including the image taking position indicated by the position information;
a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and an output section which outputs information associated with the one place determined by the place determination section; and a printer which prints the taken image acquired by the acquisition section on one surface of recording paper and prints the information outputted by the output section on the backside of the surface.

7. An information provision program storage medium in which an information provision program is stored, the information provision program being incorporated in a computer and constructing on the computer:

an acquisition section which acquires a taken image obtained by image taking and position information indicating the image taking position in the image taking;

an area determination section which determines a particular search area including the image taking position indicated by the position information;

a place determination section which determines one place from among one or more places within the search area which are included in multiple places, each of the multiple places being associated with one or more reference images and one or more pieces of shop-related information, based on the degree of similarity between the image associated with the each of the multiple places and the taken image; and an output section which outputs information associated with the one place determined by the place determination section.

* * * * *